No. 780,069.	Patented January 17, 1905.

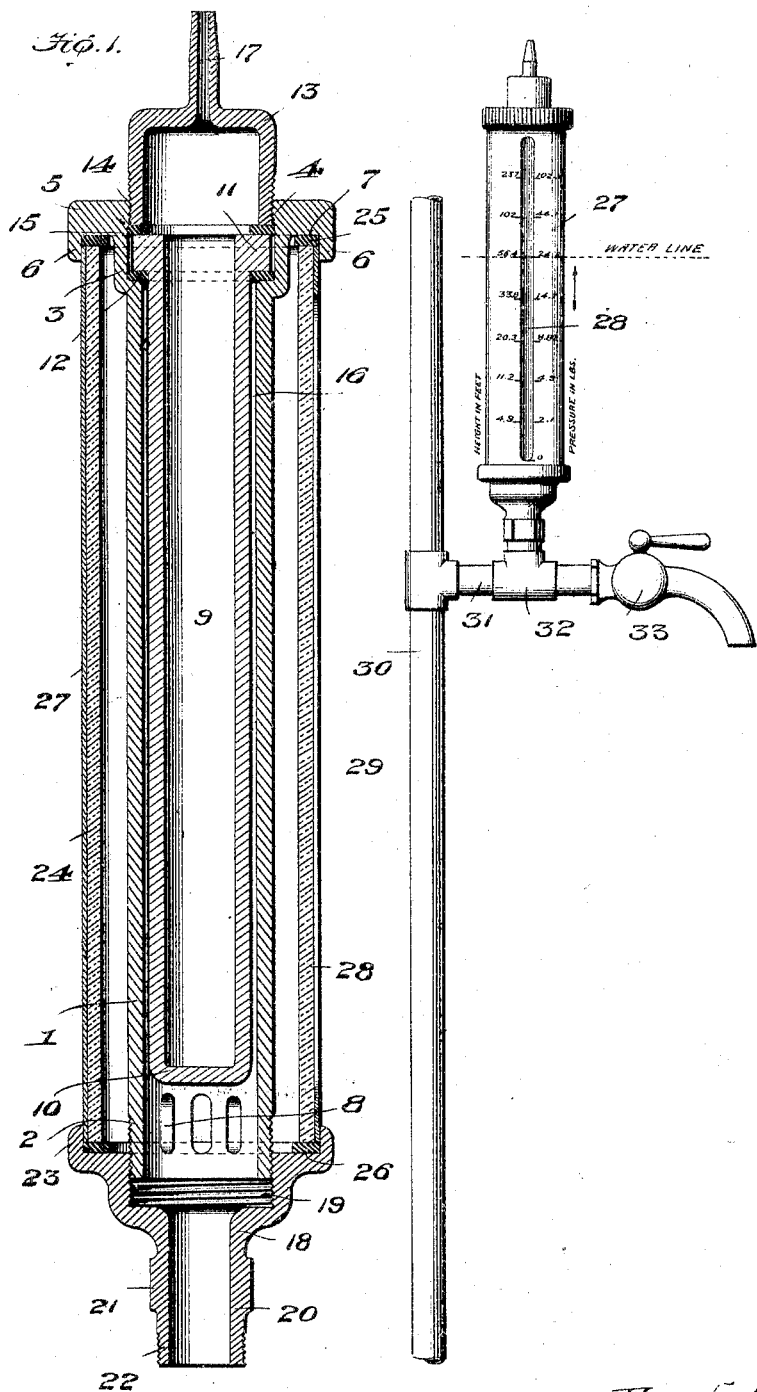

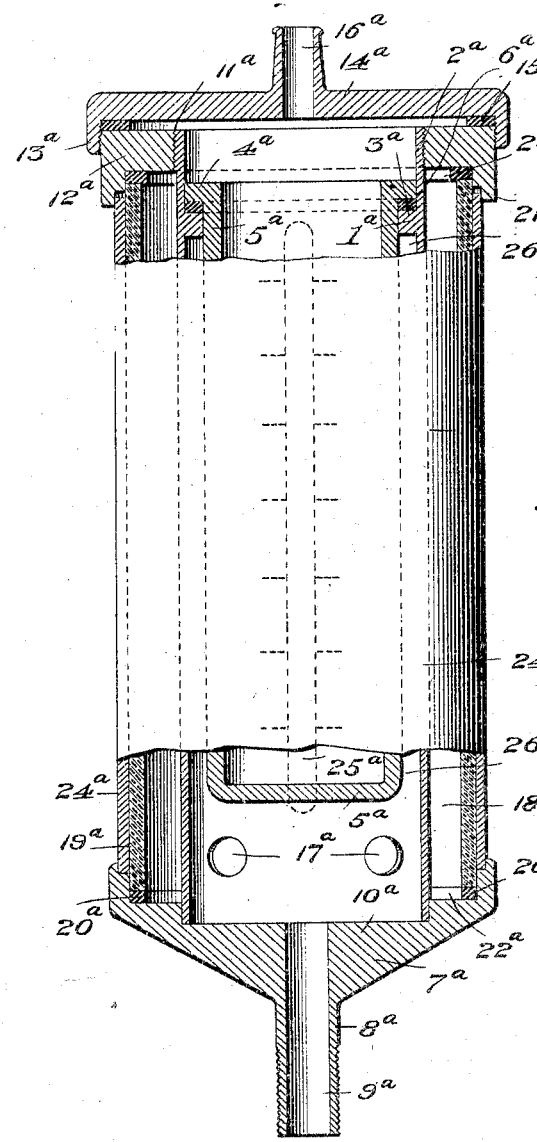
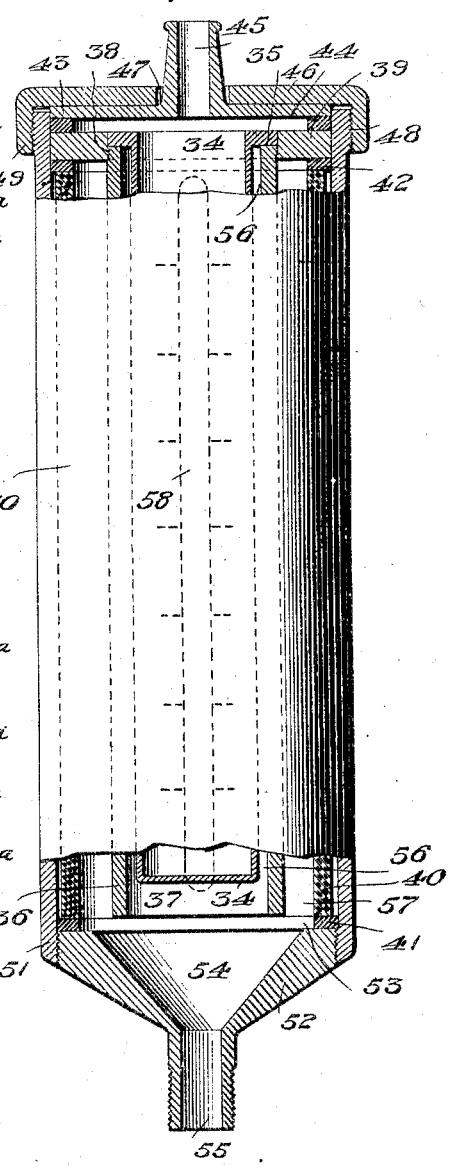

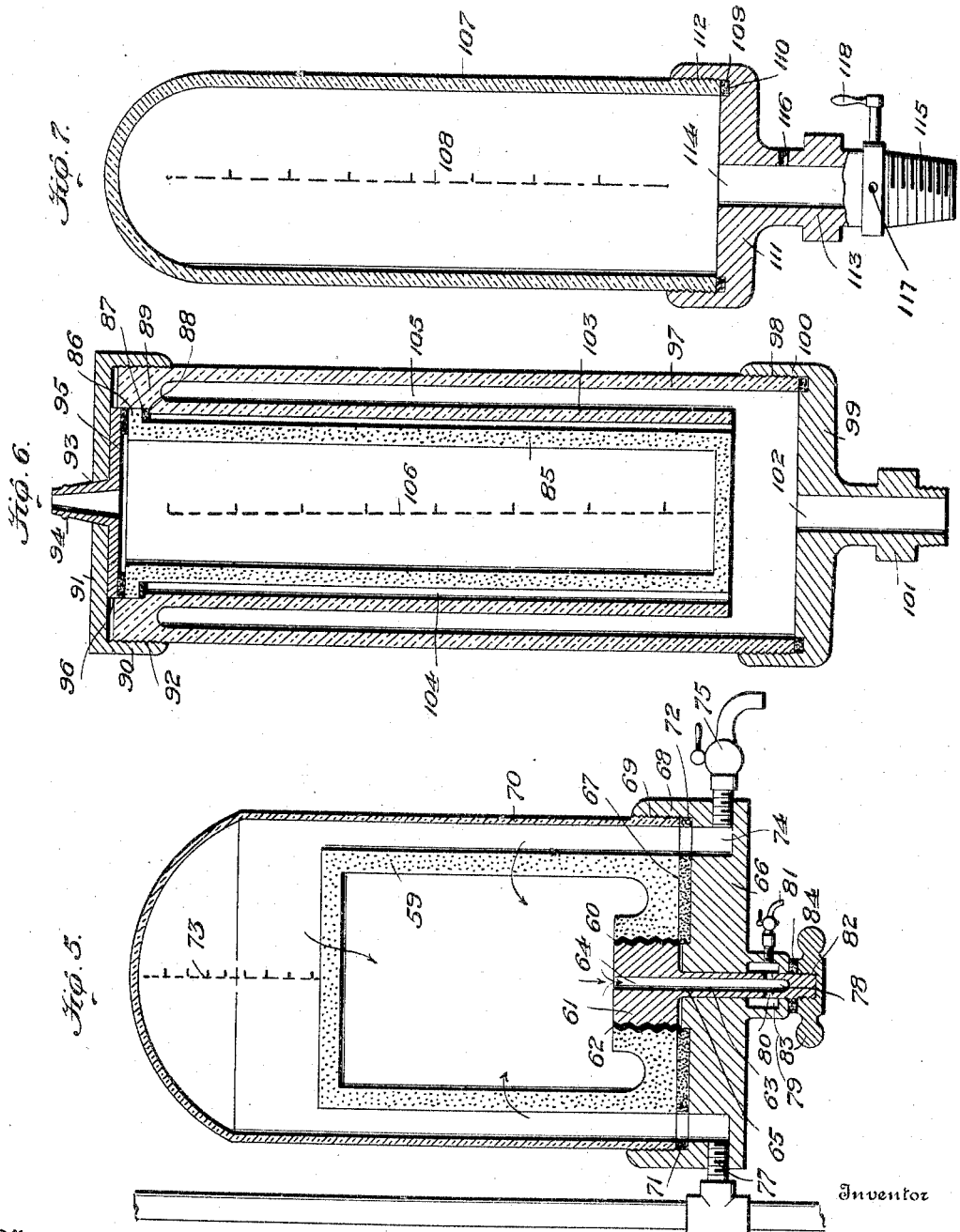

UNITED STATES PATENT OFFICE.

FRANK B. SHELDEN, OF WASHINGTON, DISTRICT OF COLUMBIA, ASSIGNOR OF ONE-HALF TO H. A. BURGESS, OF WASHINGTON, DISTRICT OF COLUMBIA.

FILTER.

SPECIFICATION forming part of Letters Patent No. 780,069, dated January 17, 1905.

Application filed May 24, 1904. Serial No. 209,567.

*To all whom it may concern:*

Be it known that I, FRANK B. SHELDEN, a citizen of the United States of America, and a resident of Washington, in the District of Columbia, have invented certain new and useful Improvements in Filters, of which the following is a specification.

This invention relates to certain new and useful improvements in filters, and especially to that class in which a porous stone or filtering medium is employed.

The present invention has for its objects, among others, to provide the filter with an air-chamber and pressure-gage. This air-chamber receives the unfiltered water and serves to prevent shocks to the water pipes and fixtures by absorbing the impact resulting from water in motion being suddenly arrested, as in suddenly closing the spigots. This so-called "water-hammer" is not only liable to injure the pipes, but is annoying to the occupants of the building. It saves frequent repairs to water pipes and fixtures caused by the excessive strains and vibration from this water-hammer. It also prevents rupture of the pipes from freezing by furnishing a yielding medium that allows the congealing water to expand. This air-chamber and pressure-gage further shows the pressure of water in pounds per square inch in the pipes and street-main, as well as the height in feet that the water can be delivered corresponding to the indicated pressure. It further shows if water can be furnished to the upper stories of a building before the plumbing is put in or installed. Many times the plumbing is all installed in the upper stories only to find that the water will not supply the fixtures, caused by leakage in the service-pipe or because the pressure is too low. It will show if the insufficient supply is caused by obstructed pipes or defective pressure. It will show if the service-pipe is totally obstructed, the supply turned off at the stop-cock, or the supply has failed in the street-main. It will serve to detect leaks in the service-pipe and fixtures by turning off the water at the stop-cock box or house stop-cock, the tension of the air in the air-chamber forcing the "dead" water in the pipes out of the openings. It will show the amount of the leak or waste, which may be easily determined by observing the gage and timing the fall of water in the same. It further affords a ready means of measuring the pressure caused by steam generating in the kitchen hot-water boiler and also prevents explosions in such boilers by furnishing a yielding medium and showing the pressure at the danger-point. The pressure-gage also serves to aid in determining the size of the tap supplying the premises, and it may also be used for testing for leaks in the gas pipes and fixtures.

Other objects and advantages of the invention will hereinafter appear, and the novel features thereof will be specifically defined by the appended claims.

The invention is capable of embodiment in a variety of forms, some of the preferable ones of which are herein illustrated. Such preferable forms are clearly illustrated in the accompanying drawings, which, with the numerals of reference marked thereon, form a part of this specification, and in which—

Figure 1 is a substantially central longitudinal section through a filter embodying my invention. Fig. 2 is an elevation, on a smaller scale, showing the application of the invention. Fig. 3 is a view, partly in elevation and partly in section, with portions broken away, showing a somewhat different form of embodiment of the principle of the invention. Fig. 4 is a similar view of another form. Fig. 5 is a substantially central vertical section through another form, shown applied to the service-pipe. Fig. 6 is a substantially central longitudinal section of still another form. Fig. 7 is a substantially central longitudinal section of an air-chamber and pressure-gage separate from the filter.

Like numerals of reference indicate like parts throughout the several views.

Referring now to the details of the drawings, referring first to Fig. 1, 1 designates a tube of metal or any suitable material of the required dimensions, which may or may not be cylindrical in cross-section, and in this instance it is shown as provided at one end with the exterior screw-threads 2 and at the other end as formed with the annular enlargement or offset 3, forming a support for a purpose which will soon be explained. This tube 1 is also formed with the interior screw-threads 4 at the outer end of the said enlargement and with the annular lateral head 5, having the annular flange or depending rim or ring 6, the annular chamber or cavity 7 thus formed serving a purpose which will soon be made apparent. Near its lower end this tube is provided with a series of openings 8. 9 is the porous filter-tube, which may be of any of the well-known materials adapted for the purpose, being closed at its lower end, as seen at 10, and having at its other end, which is open, an annular outwardly-extending enlargement 11, which is received in the annular enlargement 3 of the tube 1, as shown, a washer 12 being interposed between the under side of the enlargement of the porous wall or filter-tube and the adjacent shoulder formed by the bottom of the enlargement of the tube 1 for an obvious purpose. 13 is a cap-piece or fitting exteriorly screw-threaded, as at 14, and engaged with the screw-threads of the enlargement 5 of the tube 1, a suitable washer 15 being interposed between the adjacent ends of the said fitting and the enlargement of the filter-tube for an obvious reason. The filter-tube is thus centered and firmly held centrally within the tube 1 and out of contact therewith, leaving an annular space 16 between the outer wall of the filter-tube and the inner wall of the tube 1, into which the water flows, so that the filter-tube is at all times surrounded by the water. The fitting or cap-piece 13 is provided with a nozzle or nipple 17 for the attachment of the hose or other means, from which the filtered water may be delivered to the required place. The lower end of the tube 1 screws into a coupling or fitting 18, which is provided with the interior screw-threads 19 for this purpose and with a depending nipple 20, having a hexagonal portion 21 and screw-threads 22 for its attachment, one form of which is shown in Fig. 2. The fitting or coupling 18 is formed at its larger end with an annular ring or rim 23, as seen clearly in Fig. 1, and 24 is a glass tube fitted at its opposite ends within the rings or rims 6 and 23 of the enlargement 5 of the tube 1 and the lower fitting 18, a washer 25 being employed at the upper end, against which the upper end of the glass tube 24 engages, said washer being seated in the cavity or socket formed by the said ring 6, while a similar washer 26 is employed at the lower end and against which the lower end of the glass tube 24 engages, the said washer being seated in the cavity or socket formed by the ring 23 of the fitting 18, all as clearly shown in Fig. 1. The glass tube 24 is provided with graduations, as seen in Figs. 5 and 6, the graduations of which are arranged to show the pressure in pounds and also the height of the water in feet. In some instances it may be found desirable to protect this glass tube, in which case I employ a thin metallic tube 27, surrounding the same, as seen in Figs. 1 and 2, in which case the casing 27 will be provided with a vertical elongated slot 28, through which the water in the glass tube 24 may be readily seen, and in this case the graduations will be marked on the metal casing upon opposite sides of the said slot therein, as indicated clearly in Fig. 2. When this metal casing or protector is employed, its ends will be held within the rings 6 and 23, as indicated clearly in Fig. 1, and the ends thereof will abut against the washers 25 and 26, as seen in said Fig. 1, the parts being all clamped firmly together and held against separation by the screwing of the parts in the manner shown. The operation will be apparent. The water entering through the nipple 20 flows into the space 16 between the porous tube 9 and the tube 1 and also through the openings 8 into the space 29 between the tube 1 and the glass tube 24. The water filters through the porous filter-tube into the interior thereof and out through the nozzle or nipple 17. The water entering the air-chamber formed by the space 29 compresses the air therein in a manner well understood, and the gage indicates the pressure of the water and also the height of the water in feet in the service-pipes of the building. Air and water tight joints are formed at opposite ends of the tube 24, so that there is no leakage.

Fig. 2 illustrates but one of the various ways in which the filter can be applied. In this view 30 is the service-pipe of the building, having the lateral branch 31, on which is the T 32, to which the screw-threaded part 22 of the lower fitting 18 is connected, as indicated. A spigot 33 is provided on the outer end of this lateral branch, as shown, from which the unfiltered water may be drawn when desired.

Fig. 3 shows another form of embodiment of the invention involving the same principle. In this view the tube $1^a$ is exteriorly threaded at its upper end, as seen at $2^a$, and near said upper end is provided with the inwardly-extending shoulder or flange $3^a$, upon which is supported the outwardly-extending flange $4^a$ of the porous filter-tube $5^a$, a washer $6^a$ being interposed, as shown, to insure a tight joint. The lower end of the tube $1^a$ is held in any suitable manner, as by a tight-fitting or ground joint in the lower fitting $7^a$, having a nipple or nozzle $8^a$, with screw-threads $9^a$, for an obvious purpose, the fitting being formed with an annular depression $10^a$ to receive the end of the said tube, as shown. The screw-threaded upper end of this tube $1^a$ is engaged in the screw-threaded opening $11^a$ of the ring $12^a$, the upper end of which is exteriorly threaded, as seen at 13ª, to receive the cap-piece 14ª, a suitable washer 15ª being interposed between the cap and the ring, as shown, to insure a tight joint. The cap-piece 14ª is provided with a nipple or the like 16ª for the attachment of a flexible pipe or other means through which the filtered water may be drawn. The tube 1ª is provided near its lower end with a plurality of openings 17ª, through which the water finds its way to the space 18ª between the tube 1ª and the glass tube 19ª, which latter is held between the lower fitting 8ª and the ring 12ª, as shown, a washer 20ª being provided at the lower end and a similar washer 21ª at the upper end, against which the ends of the glass tube bears, as shown. The lower end of this glass tube is received in an annular cavity or socket 22ª in the lower fitting and in a similar cavity or socket 23ª in the lower face of the ring 12ª. The parts are all securely held together by the screwing home of the ring and cap-piece, as will be readily understood. 24ª is a metallic tube surrounding the glass tube for protection, as already explained in connection with the form shown in Fig. 1. 25ª designates the gage upon the glass or upon the metal protecting-casing when the latter is employed, in which latter instance the glass tube is visible through a slot in the metallic casing the same as described in connection with Figs. 1 and 2. 26ª is the space between the porous filter-tube and the tube 1ª, into which the water flows and from which it is filtered through said filter-tube. The operation is the same as in the form shown in Fig. 1.

In Fig. 4 is shown still another form of embodiment of the principle of the invention. In this form 34 is the porous filter-tube closed at its lower end and having at its upper end the lateral annular flange or shoulder 35, which rests upon the upper end of the tube 36, the lower end of which is open, as seen at 37, and its upper end screw-threaded, as seen at 38, and engaged with the screw-threads of the ring 39, within which also the annular flange of the upper end of the porous filter-tube is received, as shown. 40 is the glass tube. Its lower end rests upon a washer 41, and its upper end bears against a washer 42. This upper washer is engaged against the under side of the ring 39, which is engaged upon the opposite side by a similar washer 43, against which the cap-plate 44 bears, the said cap-plate having a nipple or nozzle 45 for an obvious purpose, and over this cap-plate fits the cap-piece 46, having a central opening 47, through which the said nipple passes, and a depending annular peripheral flange 48. This annular flange is screw-threaded internally, as seen at 49, and engages the screw-threads on the upper end of the metallic protecting-casing 50, the lower end of which is also interiorly screw-threaded, as seen at 51, and is engaged over the body portion of the lower fitting or coupling 52, having the annular shoulder 53, upon which the washer 41 is supported, as shown, and with the tapered chamber 54 and the depending nozzle or nipple 55 for an obvious purpose. The space between the porous filter-tube and the tube 36 is indicated by 56, while the space between the tube 36 and the glass tube is indicated by 57. 58 indicates the gage, which is of the same construction as already described in connection with Figs. 1, 2, and 3. The operation is substantially the same as that of the constructions shown in Figs. 1 and 3. In this case, however, the water instead of flowing through openings in the lower end of the tube surrounding the porous filter-tube finds a ready passage into the space 57 by reason of the open lower end of the said tube 36. The parts are all securely held together by screwing up the cap-piece, and the lower fitting and the filter-tube is centrally held within its surrounding tube and at all times out of contact therewith. The washers insure perfectly tight joints, and the parts are readily assembled or dissembled for cleaning or for repairs or for other purposes. The tapered chamber of the lower fitting or casting affords a ready flow for the water entering the nozzle or nipple 55 and into the spaces 56 and 57.

Referring to Fig. 5, 59 is the filter-tube, closed at its upper end and at its lower end having a central opening 60, receiving the plug 61, which is cemented therein by suitable cement 62, the said plug having a depending stem 63, through which there is a passage 64, this stem passing through an opening 65 in the base 66, and between the upper face of this base and the lower end of the porous filter-tube is a washer or a layer of cement 67, as shown. The base 66 has an annular upwardly-extending flange 68, which is interiorly screw-threaded, as seen at 69, and receives the lower end of the glass casing 70, a suitable washer 71 being provided between the lower end of this casing and the shoulder 72, formed on the base 66, as shown. The glass casing is provided with the gage or graduations 73, and the base is formed with the annular channel 74, with which connects the spigot 75, through which the water in the chamber surrounding the filter-tube may be withdrawn when desired. 76 is the service-pipe, connected with the channel 74 by the connection 77. The stem 63 of the plug 61 is provided with a plurality of lateral openings 78, which communicate with a chamber 79, formed in the depending casing 80, as seen, and from this chamber the filtered water may be withdrawn when desired through a spigot 81. The lower end of the stem 63 is screw-threaded, as seen at 82, to receive a thumb-nut 83, a suitable washer 84 being interposed between the upper face of the grasping portion of the thumb-nut and the under face of the casing 80 for an obvious purpose. The operation of this form of the invention is substantially the same as that of the other forms before described. The arrows in Fig. 5 indicate the direction taken by the water. The inflowing water entering the chamber formed between the porous filter and its inclosing casing compresses the air in the upper portion of such chamber, and the water finding its way through the filter-tube is collected within the same and withdrawn through the spigot 81 in the manner illustrated in the said Fig. 5.

Fig. 6 shows still another form. In this view 85 is the filter-tube, having at its upper end the annular outwardly-extending shoulder or flange 86, which rests upon a washer 87, which in turn is supported on a shoulder 88 of the casing 89, which is formed with the double walls, as shown, the upper end of the outer wall being screw-threaded, as seen at 90, to receive the cap-piece 91, the annular depending flange 92 of which engages the said screw-threads, as shown. This cap-piece has a central opening 93, through which passes the nozzle or nipple 94 on the top plate 95, which rests upon a washer 96, bearing upon the upper face of the flange 86 of the filter-tube. The lower end of the outer wall 97 of the casing is screw-threaded, as seen at 98, and receives the lower coupling or fitting 99, the flange 100 of which is screw-threaded, as seen, to engage the screw-threads of the said lower end of the wall 97, and this fitting is provided with the depending nozzle or nipple 101, with a passage 102 therethrough for an obvious purpose. The inner depending wall 103 of the casing terminates at the lower end of the porous filter-tube, as shown, and there is a space 104 between this inner wall and the filter-tube, as seen, for the passage of the water to surround the filter-tube, the space 105 between the outer wall 97 and the said inner wall forming the air-chamber, into which the unfiltered water flows as it enters the filter from the service-pipe, as will be readily understood. 106 indicates the graduations or gage upon the outer wall of the casing. The operation of this form of the device is substantially the same as that of all the other forms hereinbefore described.

In Fig. 7 I have illustrated the air-chamber and pressure-gage independent of the filter to demonstrate how it can be used for various purposes independent of the filtering operation. In this figure 107 is the glass casing, closed at its upper end and provided with the gage or graduations 108, similar to those in Fig. 1 and those in the other forms previously described. The lower end of the cylinder or casing rests upon a washer 109, seated in an annular recess 110 in the coupling or fitting 111 and surrounded by the upwardly-extending flange 112, which is screw-threaded to receive the screw-threaded lower end of the casing, as shown. The coupling or fitting 111 is provided with a depending nozzle or nipple 113, having the passage 114 therethrough and its lower end screw-threaded, as shown at 115. 116 is a vent opening from the passage 114 (for a vent-cock) for recharging the chamber, while 117 is a bleed-opening, and 118 a cock controlling the flow through the passage 114. The water entering the chamber compresses the air therein, and the gage serves to indicate the pressure of water per square inch in pounds in the street-main and in the pipes of the building, as well as the height in feet that the water can be delivered. It shows if the water can be furnished to the fixtures in the upper story of the building. It will indicate if the pipes are obstructed, and it can be used for the purpose of detecting leaks in the service-pipes or in the gas-pipes of the house. Furthermore, it will prevent damage to the pipes and boiler in the kitchen and will prevent the water-hammer so common and obnoxious.

From the above it will be seen that I have devised a simple yet efficient form of filter and air-chamber and pressure-gage, and while the structural embodiment of the invention as hereinbefore set forth discloses what I at the present time consider the preferable ways of carrying out the invention it is obvious that the same is subject to changes, variations, and modifications without departing from the spirit of the invention or sacrificing any of its advantages. I therefore do not wish to be limited to the details of construction herein disclosed, but reserve the right to make such changes, variations, and modifications as come properly within the scope of the protection prayed.

What is claimed as new is—

1. In a filter, a casing, a porous filter-tube therein, and an air-chamber and pressure-gage independent of the said filter-tube and adapted to receive the unfiltered water.

2. In a filter, a casing and a combined air-chamber and pressure-gage adapted to receive the unfiltered water, as and for the purposes specified.

3. In a filter, a porous filter-tube, a tube surrounding the same, and an air-chamber and pressure-gage inclosing the filter-tube and having water and air tight joints at its ends.

4. In a filter, a porous filter-tube, means for supporting the same at one end, means for admitting unfiltered water to the exterior of said filter-tube, and an air-chamber and pressure-gage surrounding the said filter-tube.

5. In a filter, a porous filter-tube, means supporting the same at one end, a casing surrounding said filter-tube with an air-chamber and pressure-gage between the tube and casing, means for admitting unfiltered water to said air-chamber and means for withdrawing the filtered water from the interior of said filter-tube.

6. In a filter, a porous filter-tube, a casing surrounding the same with an air-chamber and pressure-gage intermediate the tube and casing, a fitting at the lower end of the casing forming a tight joint therewith, and means for admitting water through said fitting into the air-chamber and around the filter-tube.

7. In a filter, a porous filter-tube, a support for the same at one end, a glass casing with an interposed air-chamber and pressure-gage, and a metallic casing around the glass casing.

8. In a filter, a porous filter-tube with surrounding air-chamber and pressure-gage, means for admitting a fluid to said air-chamber and surrounding the filter-tube, means forming water and air tight joints at top and bottom, and means for withdrawing the filtered water.

9. In a filter, a porous filter-tube, an inclosing casing with interposed air-chamber and pressure-gage, means supporting the filter-tube concentric within the air-chamber, and means for forming air and water tight joints at top and bottom of the air-chamber.

Signed by me at Washington, District of Columbia, this 20th day of May, 1904.

FRANK B. SHELDEN.

Witnesses:
  CARL D. RITTER,
  CHAS. P. SEEBOLD.